(12) United States Patent
Cassidy et al.

(10) Patent No.: US 12,406,174 B2
(45) Date of Patent: Sep. 2, 2025

(54) MULTI-AGENT INSTRUCTION EXECUTION ENGINE FOR NEURAL INFERENCE PROCESSING

(71) Applicant: INTERNATIONAL BUSINESS MACHINES CORPORATION, Armonk, NY (US)

(72) Inventors: Andrew S. Cassidy, San Jose, CA (US); Simon J. Hollis, San Jose, CA (US); Hartmut Penner, San Jose, CA (US); Jun Sawada, Austin, TX (US); Pallab Datta, San Jose, CA (US); John V. Arthur, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1110 days.

(21) Appl. No.: 16/161,867

(22) Filed: Oct. 16, 2018

(65) Prior Publication Data

US 2020/0117465 A1 Apr. 16, 2020

(51) Int. Cl.
  *G06N 3/063* (2023.01)
  *G06F 9/30* (2018.01)
  (Continued)

(52) U.S. Cl.
  CPC .......... *G06N 3/063* (2013.01); *G06F 9/30036* (2013.01); *G06F 9/3887* (2013.01); *G06N 3/04* (2013.01)

(58) Field of Classification Search
  CPC .......... G06F 9/3851; G06N 3/063; G06N 3/04
  See application file for complete search history.

(56) References Cited

U.S. PATENT DOCUMENTS 7,970,970 B2 6/2011 Subramanian et al.
9,063,783 B2 6/2015 Drepper
(Continued)

FOREIGN PATENT DOCUMENTS

WO 2018/071392 A1 4/2018

OTHER PUBLICATIONS

Byrd, Gregory T., and Mark A. Holliday. "Multithreaded processor architectures." IEEE Spectrum 32.8 (1995): 38-46. (Year: 1995).*
(Continued)

*Primary Examiner* — Casey R. Garner
(74) *Attorney, Agent, or Firm* — Erik A. Huestis; Katherine L. Baker; Foley Hoag LLP

(57) ABSTRACT

Multi-agent instruction execution engines for neural inference processing are provided. In various embodiments, a neural core is provided. The neural core includes an instruction memory. The instruction memory comprises a plurality of instruction streams, each instruction stream associated with one of a plurality of agents. The instruction memory further comprises a plurality of shared functional units. The neural core is adapted to concurrently execute the plurality of instruction streams on the plurality of associated agents. The execution includes maintaining a separate program counter for each of the plurality of agents, determining a plurality of operations from the instructions of each instruction stream, and directing the operations to the shared functional units. The instructions of each instruction stream are statically scheduled prior to runtime to ensure their execution is conflict free.

22 Claims, 9 Drawing Sheets

(51) Int. Cl.
*G06F 9/38* (2018.01)
*G06N 3/04* (2023.01)

(56) References Cited

U.S. PATENT DOCUMENTS

| | | | |
|---|---|---|---|
| 9,577,911 | B1 | 2/2017 | Castleman |
| 9,843,628 | B2 | 12/2017 | Brueckner |
| 9,961,012 | B2 | 5/2018 | Dutta et al. |
| 2014/0173122 | A1 | 6/2014 | Sunderrajan |
| 2014/0229421 | A1 | 8/2014 | Thomas |
| 2017/0161638 | A1 | 6/2017 | Garagic et al. |
| 2018/0024870 | A1 | 1/2018 | Grebnov et al. |
| 2018/0096283 | A1 | 4/2018 | Wang et al. |
| 2018/0096284 | A1 | 4/2018 | Stets et al. |
| 2018/0225116 | A1* | 8/2018 | Henry ............... G06F 17/10 |
| 2018/0260691 | A1* | 9/2018 | Nagaraja ............ G06N 3/0454 |
| 2018/0260700 | A1* | 9/2018 | Nagaraja ............ G06N 3/0445 |

OTHER PUBLICATIONS

Hirata, Hiroaki, et al. "An elementary processor architecture with simultaneous instruction issuing from multiple threads." Proceedings of the 19th annual international symposium on Computer architecture. 1992. (Year: 1992).*

Lopes et al., "Negotiation Strategies For Autonomous Computational Agents," (2004).

Neruda et al., "Computational Intelligence Agent-Oriented Modelling," 4th WSEAS Int. Conf. on Computational Intelligence, Man-Machine Systems and Cybernetics, Miami, Florida, USA, pp. 238-241 (Nov. 17-19, 2005).

Smith et al., "Computational Inference of Neural Information Flow Networks," PLoS Computational Biology, 2(11): e161, pp. 1436-1449 (2006).

Neruda et al., "Toward Dynamic Generation of Computational Agents by Means of Logical Descriptions." International Transactions on Systems Science and Applications: 6 pages (2008).

* cited by examiner

MULTI-AGENT INSTRUCTION EXECUTION ENGINE FOR NEURAL INFERENCE PROCESSING

BACKGROUND

Embodiments of the present disclosure relate to neuromorphic processor chips, and more specifically, to a multi-agent instruction execution engine for neural inference processing.

BRIEF SUMMARY

According to embodiments of the present disclosure, a neural core is provided. The neural core includes an instruction memory. The instruction memory comprises a plurality of instruction streams, each instruction stream associated with one of a plurality of agents. The instruction memory further comprises a plurality of shared functional units. The neural core is adapted to concurrently execute the plurality of instruction streams on the plurality of associated agents. The execution includes maintaining a separate program counter for each of the plurality of agents, determining a plurality of operations from the instructions of each instruction stream, and directing the operations to the shared functional units.

According to embodiments of the present disclosure, methods of and computer program products for multi-agent instruction execution are provided. In various embodiments, a plurality of instruction streams is read from an instruction memory of a neural core, each instruction stream associated with one of a plurality of agents. The plurality of agents is concurrently executed by the neural core. A separate program counter is maintained for each of the plurality of agents. A plurality of operations is determined from the instructions of each instruction stream. The operations are directed to shared functional units of the neural core. The instructions of each instruction stream are statically scheduled prior to runtime to ensure their execution is conflict free.

DETAILED DESCRIPTION

Figure 1:
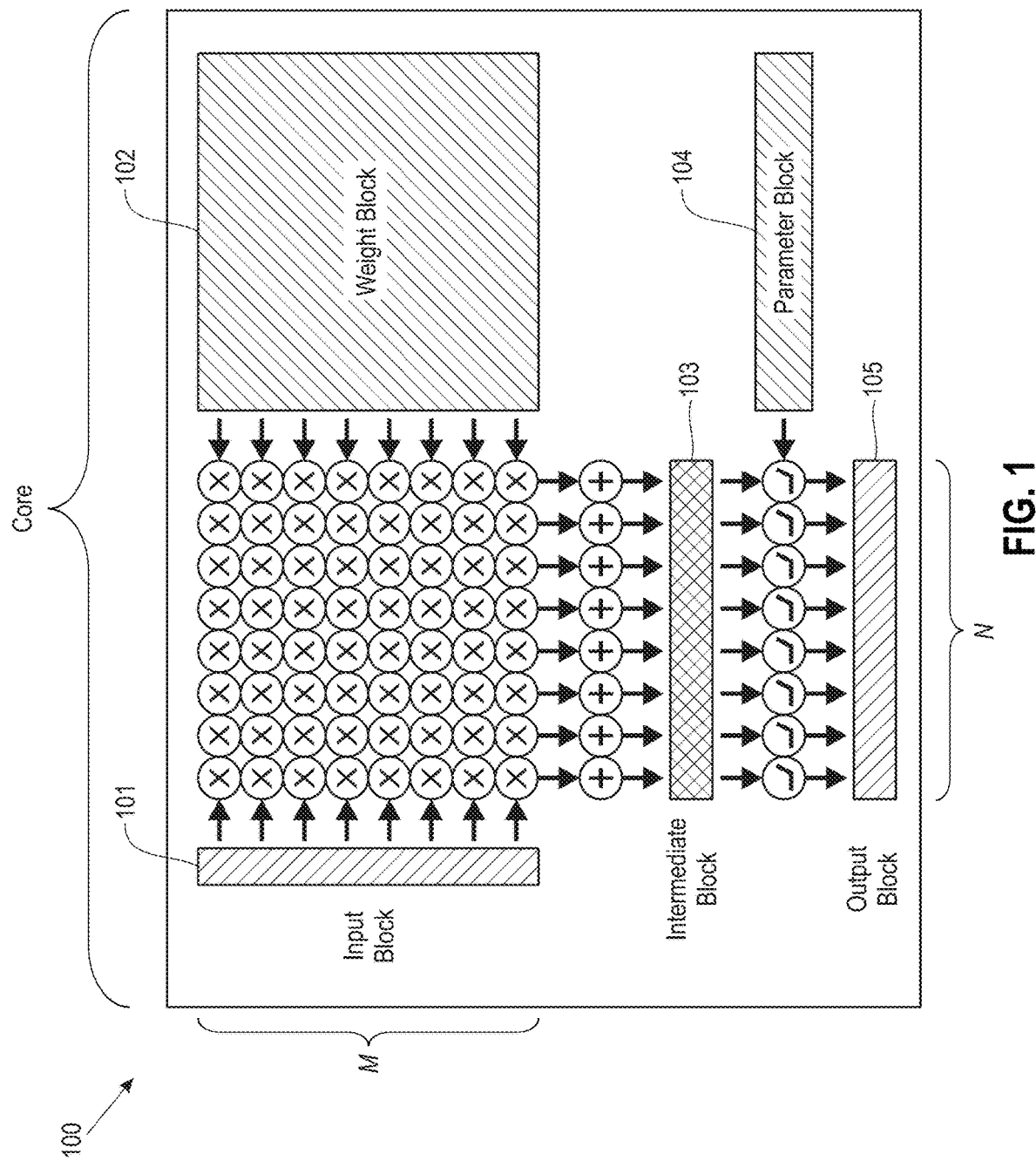
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions σ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters $V[i,j,k,:]$, and the weighted sum $Z[i,j,k]$ can be computed as in Equation 2.

$$Y[i, j, k] = \sigma(V[i, j, k, :]; Z[i, j, k]) \qquad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \qquad \text{Equation 2}$$

For simplicity of notation, the weighted sum in Equation 2 may be referred to as the output, which is equivalent to using a linear activation function $Y[i,j, k]=\sigma(Z[i,j, k])=Z[i,j, k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be appreciated from the above that neural inference processing is parallelizable. In particular, a Neural Inference Processor core exploits algorithmic parallelism in a variety of ways. Vector/Matrix parallelism allows multiple parallel arithmetic units to perform the same operation (on a vector or matrix). Pipeline parallelism allows multiple arithmetic functions to be pipelined, including vector-matrix multiplication, vector arithmetic, and activation function. Data path parallelism allows parallel partial sum computations and communication operations. The core interconnect has multiple arithmetic and communication paths for performing multiple partial sum computation and/or communication operations in parallel.

The present disclosure describes a processing system that exploits the pipeline parallelism and data path parallelism in a single neural processing core by means of multi-agent computation.

A neural inference computation takes place on one or more cores of computation. Each core is capable of executing multiple computational components of the inference computation concurrently. These may be multiple parts of a sequence of independent instructions comprising a single computation. For example, partial sums may be computed based on a weight and input activation, executing in parallel with a partial sum accumulation relating to a different receptive field. They may be independent computations, running in parallel, e.g., the accumulation of two sets of partial sums, relating to different input fields. They may be overlapped computations, e.g., the last operations of one inference frame, plus the first operations of another inference pass.

Operation of a Neural Inference Processor core is controlled by a core microengine. The operations performed by the neural inference core include arithmetic and logical computation, communication, and memory addressing operations. The core microengine may be composed of one or more agents. Multiple agents enable parallel control of the parallel datapaths and parallel functional units within the neural core.

In various embodiments, a multi-agent processing core supports one or more computational agents. In various embodiments, each agent:

Specifies one or more source/target operands;
Specifies one or more computation/communication/address operations;
Executes independently of any other agent, using dedicated, per-agent program control flow;
May or may not be allowed to use the same source operands as another agent;
May or may not be allowed to use the same target operands as another agent (but never at the same time);
May or may not be allowed to use the same computation/communication/address unit(s) as another agent (but never at the same time).

Agents are bound to functional units at run-time on a time-step-by-time-step basis. Agents functional unit binding is scheduled by a compiler software component of the system.

In various embodiments, independent control flow (instruction streams) is provided per agent. Data merge operations are used to combine independent agent operations. Various embodiments include a pool of shared datapath resources (e.g., source/target operands and computational/communication/address units). Scheduling of independent agent instructions coordinates combined operation.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
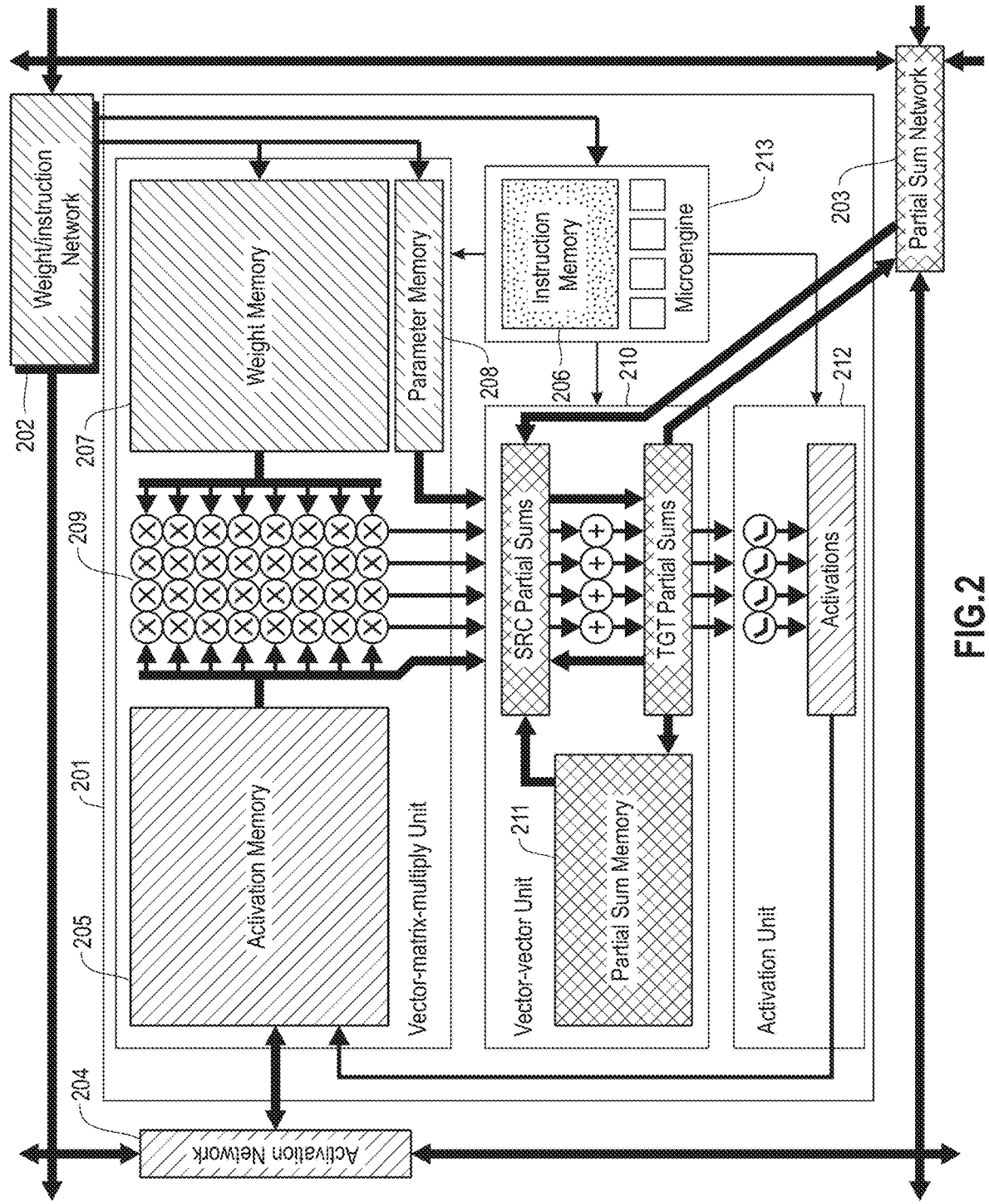
FIG. 2 illustrates a neural core and associated networks according to embodiments of the present disclosure.

With reference now to FIG. 2, an exemplary neural core and associated networks are illustrated according to embodiments of the present disclosure. Core 201, which may be embodied as described with reference to FIG. 1 is interconnected with additional cores by networks 202 . . . 204. In this embodiments, network 202 is responsible for distributing weights and/or instructions, network 203 is responsible for distributing partial sums, and network 204 is responsible for distributing activations. However, it will be appreciated that the various embodiments of the present disclosure may combine these networks, or further separate them into multiple additional networks.

Referring to FIG. 2, input activations (X) are distributed to core 201 from off-core via activation network 204 to activation memory 205. Layer instructions are distributed to core 201 from off-core via weight/instruction network 202 to instruction memory 206. Layer weights (W) and/or parameters are distributed to core 201 from off-core via weight/instruction network 202 to weight memory 207 and/or parameter memory 208.

The weight matrix (W) is read from weight memory 207 by Vector Matrix Multiply (VMM) unit 209. The activation vector (V) is read from activation memory 205 by Vector Matrix Multiply (VMM) unit 209. Vector Matrix Multiply (VMM) unit 209 then computes vector-matrix multiplication $Z=X^TW$ and provides the result to Vector-Vector unit 210. Vector-Vector unit 210 reads additional partial sums from partial sum memory 211, and receives additional partial sums from off-core via partial sum network 203. A vector-vector operation is computed by Vector-Vector unit 210 from these source partial sums. For example, the various partial sums may in turn be summed. The resulting target partial sums are written to partial sum memory 211, sent off-core via partial sum network 203, and/or fed back for further processing by Vector-Vector unit 210.

The partial sum results from Vector-Vector unit 210, after all computation for a given layer's inputs is complete, are provided to activation unit 212 for the computation of output activations. The activation vector (Y) is written to activation memory 205. Layer activations (including the results written to activation memory) are redistributed across cores from activation memory 205 via activation network 204. Upon receipt, they are written to local activation memory to each receiving core. Upon completion of processing for a given frame, the output activations are read from activation memory 205 and sent off-core via network 204.

Accordingly, in operation, a core control microengine (e.g., 213) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, such that vector-matrix multiply unit compute array computes a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation compute operation, such that the activation arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 210 include Vector Matrix Multiply (VMM) unit 209, activation memory 205, constants from parameter memory 208, partial sum memory 211, partial sum results from prior cycles (TGT partial sums); and partial sum network 203.

Targets for vector-vector unit 210 include partial sum memory 211, partial sum results for subsequent cycles (SRC partial sums), activation unit 212, and partial sum network 203.

Accordingly, a given instruction may read or write from activation memory 205, read from weight memory 207, or read or write from partial sum memory 211. Compute operations performed by the core include vector matrix multiplication by VMM unit 209, vector (partial sum) operations by vector unit 210, and activation functions by activation unit 212.

Control operations include program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters.

Figure 3:
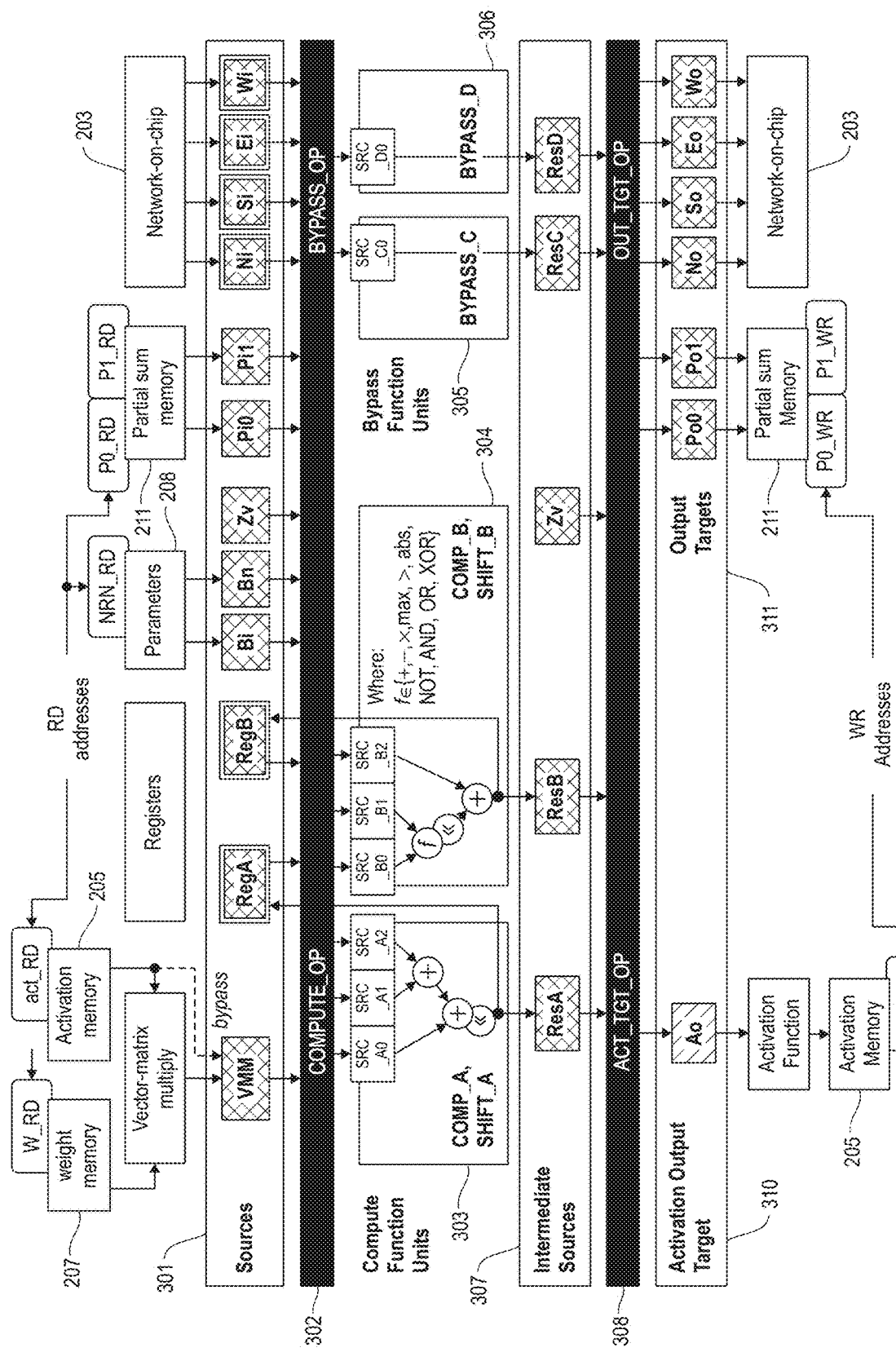
FIG. 3 is a detail view of a vector unit according to embodiments of the present disclosure.

Referring to FIG. 3, a detail view of a vector unit slice according to embodiments of the present disclosure is provided. A vector unit has many vector unit slices, to operate on all the elements of a vector in parallel, so just a slice is depicted here. In some embodiments, all slices of the vector unit perform the same operations at the same time on their respective vector elements in parallel. Sources 301 correspond to the sources described above. In particular, weight memory 207 is accessed at read address W_RD and activation memory 205 is accessed at read address act_RD to provide input to vector-matrix multiplication, the result of which in turn serves as a source to the vector-vector unit. Parameter memory 208 is accessed at read address NRN_RD to provide parameters to the vector-vector unit. Partial sum memory 211 is accessed at read address P0_RD and P1_RD to retrieve partial sum operands for the vector-vector unit. The network on chip 203 is used to provide partial sum inputs to the vector-vector unit. As pictured, inputs are received from four cardinal directions, north, south, east, and west. However, it will be appreciated that a variety of network configurations may be used according to the present disclosure to allow receipt of inputs from arbitrary cores.

Operations 302 include Compute OPs (COMPUTE_OP) and Bypass OPs (BYPASS_OP). Compute OPs Map sources 301 to the compute function units 303, 304 (A and B) and specify computation to be performed by the compute function units. Bypass OPs (BYPASS_OP) Map sources 301 to bypass function units 305, 306 (C and D). The results of computation or bypass make up intermediate sources 307.

Operations 308 on intermediate sources 307 include Output Target OPs (OUT_TGT_OP) and Activation Output Target OP (ACT_TGT_OP). Output Target Ops Map intermediate sources 307 to output targets 309. Activation Output Target OPs Map intermediate sources 307 to activation output target 310 and specify computation to be performed by the activation function unit.

The results of the activation function are written to activation memory 205 at write address act_WR. Partial sums are written to partial sum memory 311 at write addresses P0_WR and P1_WR. Network outputs are sent via network 203. As pictured, outputs are sent to four cardinal directions, north, south, east, and west. However, it will be appreciated that a variety of network configurations may be used according to the present disclosure to allow sending output to arbitrary cores.

It will be appreciated that a given core may include a plurality of function units. Accordingly, FIG. 3 depicts one slice of a vector-vector unit for simplicity of description.

Figure 4:
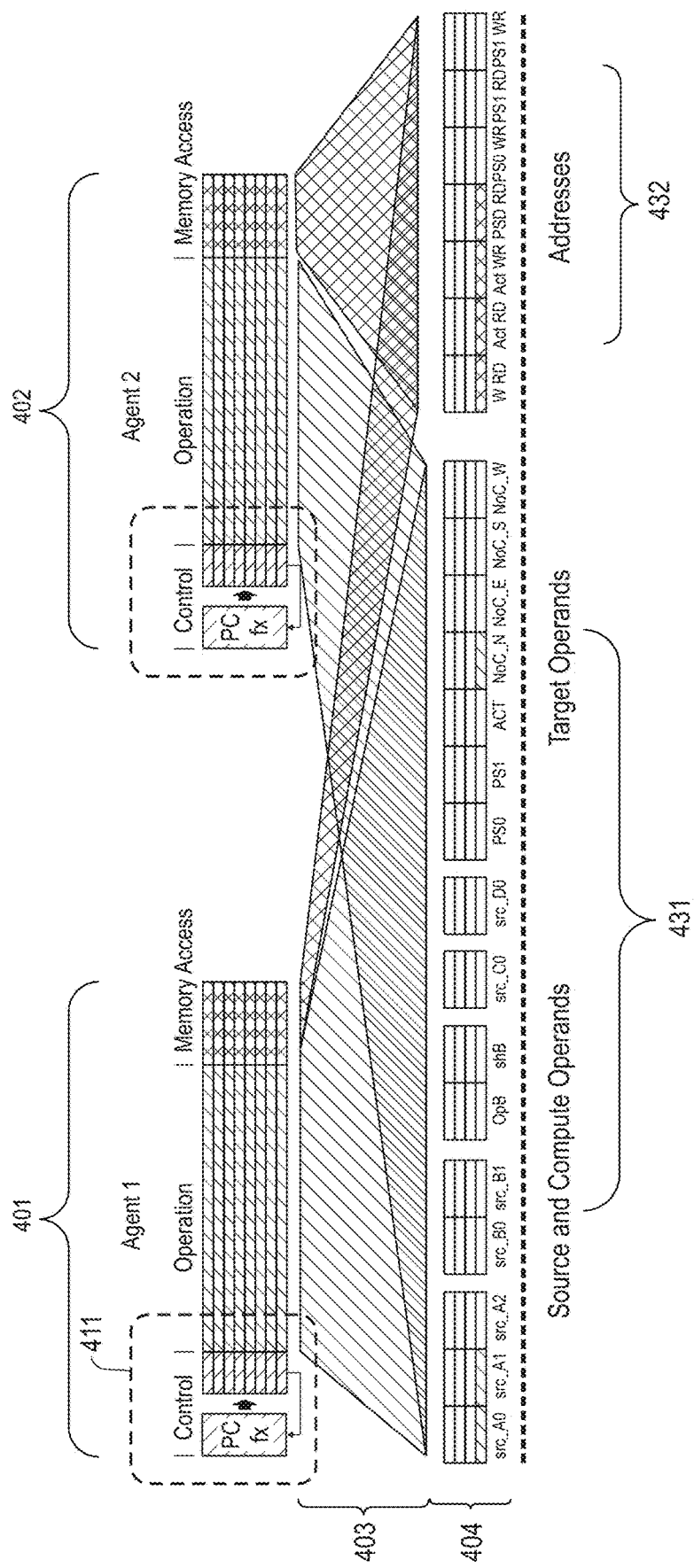
FIG. 4 is a schematic view is provided of two independent agents controlling a shared pool of functional units according to embodiments of the present disclosure.

Referring to FIG. 4, a schematic view is provided of two independent agents controlling a shared pool of functional units. Agents 401 . . . 402 include independent control 411. Operations 412 and memory access 413 are subject to a merge process 403 upon access to shared resources 404, including shared operands 431 and shared addresses 432.

Operation of the core data path(s) can be expressed in the form of an execution master equation, below.

$$VMM = X^T W$$

$$(0/1)PS\_reg(+) \ (0/1)VMM(+) \ (0/1)NoC\_[W/E/S/N](+)$$
$$(0/1)PS\_mem[n] => \{NoC\_[W/E/S/N], PS\_reg,$$
$$PS\_mem[n], act\_fx\} \quad \text{Equation 3}$$

In this formulation, an operation is a mapping from source operands to target operand, with an optional arithmetic operation/transformation included. For example, a source may be mapped directly to a target ([TGT]←[SRC]) or a combination of sources may be mapped to a target with a summation operator ([TGT]←[SRC1]+[SRC2]).

Figure 5:
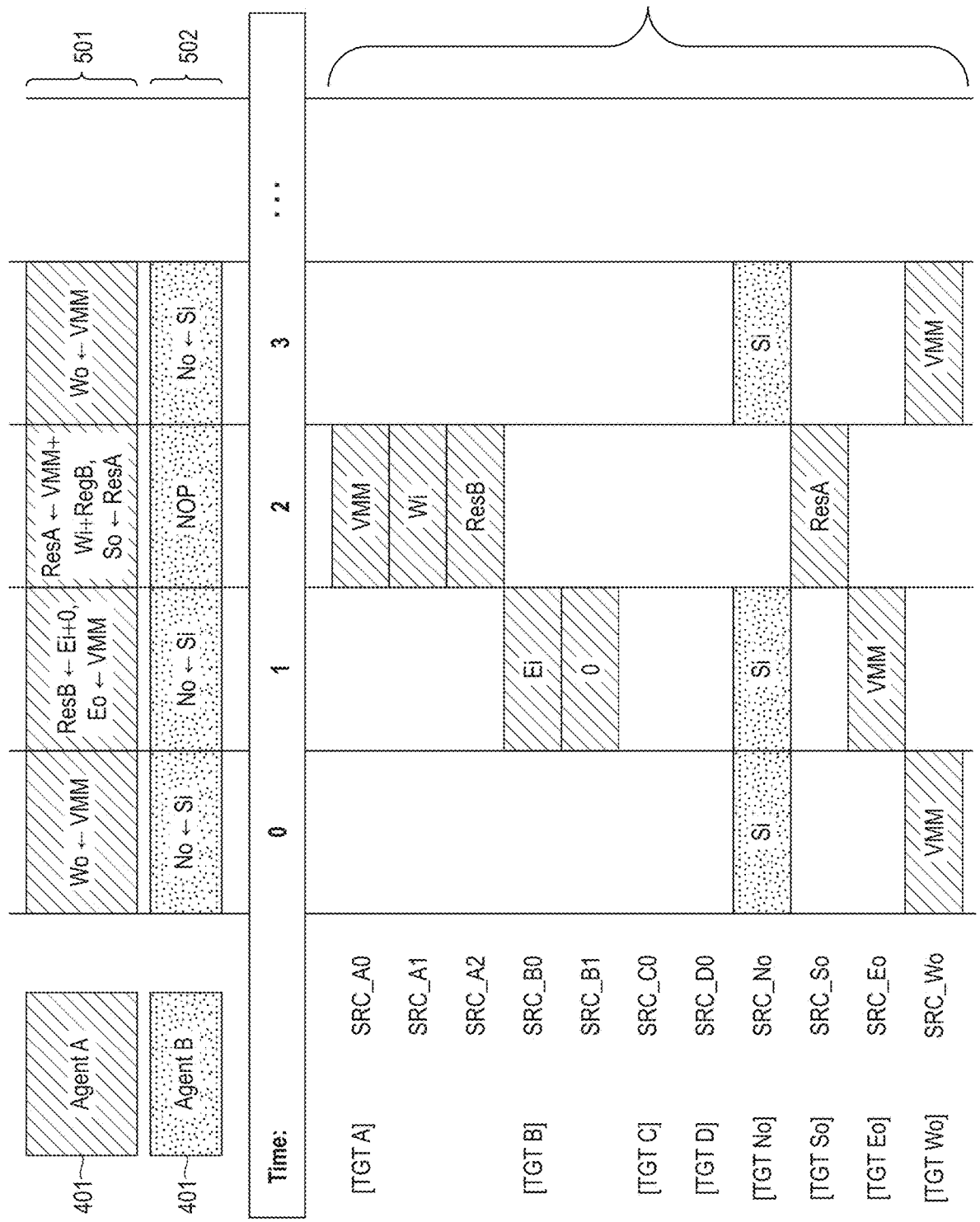
FIG. 5 illustrates agent control flow according to embodiments of the present disclosure.

Referring to FIG. 5, agent control flow is illustrated according to embodiments of the present disclosure. In this embodiment, each agent has its own control flow. One Program Counter (PC) is maintained per agent. Each agent (e.g., 401, 401) includes a control engine (e.g., 411), deterministically modifying the program counter. Each agent issues computation/communication/address operations independently. In this example, agent 401 executed instruction stream 501, while agent 402 executes instruction stream 502. Each instruction is illustrated as a block. Within each time window, operations and operands are issued 503 to the sources and targets. The overall program flow across all agents is statically analyzable and visible only to the software compiler component. In various embodiments, there is no dynamic scheduling of agents. NOPs may be statically inserted by the compiler if pauses are needed.

Figure 6:
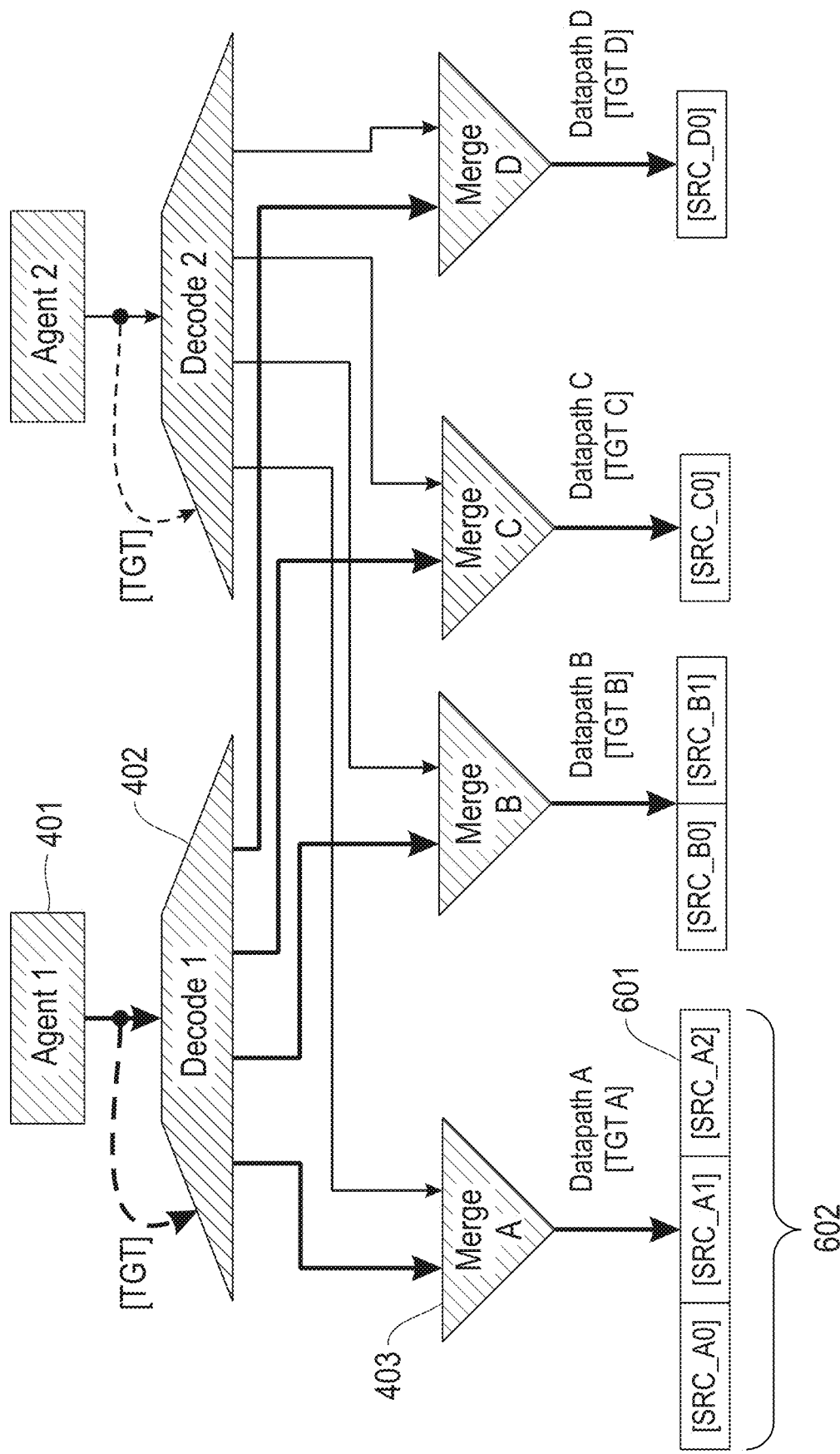
FIG. 6 illustrates operand and operation merging according to embodiments of the present disclosure.

Referring to FIG. 6, operand and operation merging is illustrated according to embodiments of the present disclosure. To issue an operation an agent 401 writes source (SRC) operands 601, and optionally arithmetic operations (not pictured), into the control registers 602 of target (TGT) resource. This claims the target (TGT) functional unit resource.

In various embodiments, agent 401 sends an instruction via an on-chip network as described above. The instruction is decoded at decoder block 402, which may be resident at a given core. To the extent that multiple instructions are received per data path, merge block 403 mediates access to the control registers 602.

In the event that more than one agent claims the same target (TGT) functional unit resource in the same cycle, there is a conflict. In various embodiments, any such conflicts result in an error condition (some operations will not be able to complete correctly). In some embodiments, a static schedule is provided, and so no conflicts should arise in the course of normal operation. Accordingly, a conflict generally indicates an error at compilation time, or an abnormal synchronization state. In various embodiments, different conflict resolution approaches may be taken. For example, both agent's claims may be invalidated, agent claim priorities may be determined statically, or dynamic arbitration between agent claims may be provided.

As set above, a variety of data path operations are provided, including: Vector Matrix Multiply; Vector-Vector manipulation; Partial-sum exchange network, Partial-sum memories, Activation memory access, Weight access, and Local register access. Various shared source operands are also provided, including Computation Results, Memories, Registers, and Communication (NoC) Ports.

In various embodiments, a static scheduling method is provided for inter-agent interaction modeling and resource conflict resolution. In particular, in the multi-agent system, (error-free) resource arbitration is performed statically, at compile time. Multiple agents may share a common resource, e.g., agents 401 and 402 may both access a single hardware addition unit. Static scheduling provides a method for preventing simultaneous access and resource conflicts. In various embodiments, scheduling is performed by generating a sequence of desired agent operations, and tracking agent program counter state offline. If simultaneous access to a resource is modelled, then delay (e.g., by NOP insertion) of one or more agents is included in the schedule.

Figure 7:
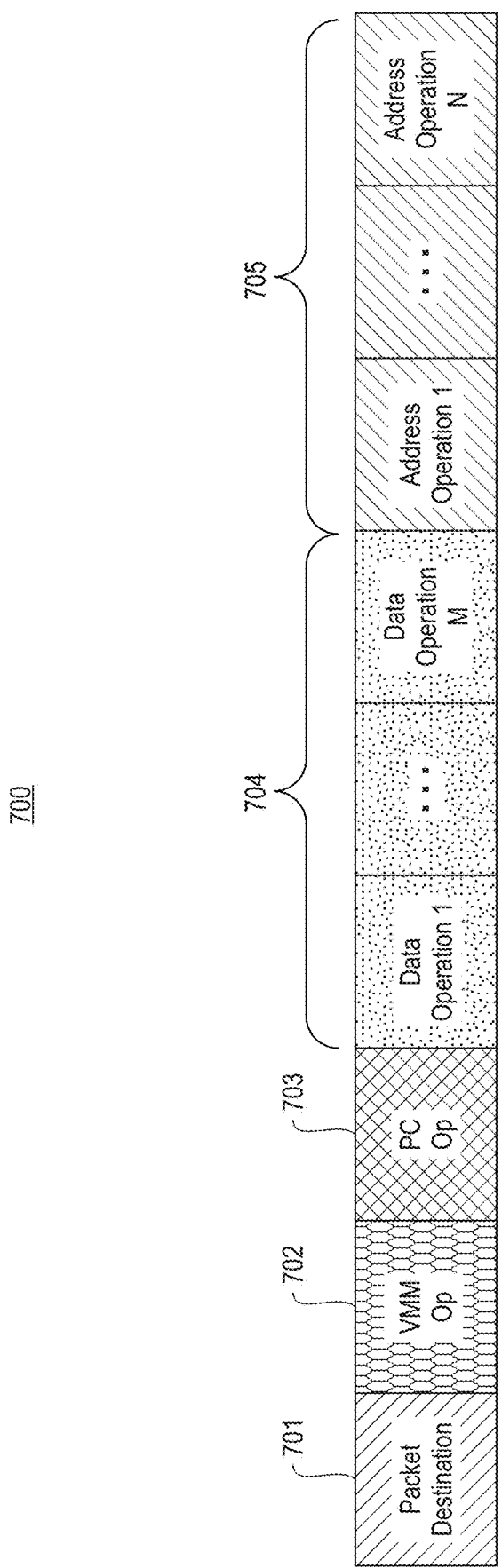
FIG. 7 illustrates an exemplary instruction format according to embodiments of the present disclosure.

Referring now to FIG. 7, an exemplary instruction format is illustrated according to the present disclosure. This multiple instruction word (MIW) may be used as the instruction distribution vehicle as set out above. A fixed length word is provided, with multiple encodings. Word 700 includes packet destination address 701, indicating a destination core and enabling routing via an on-chip network. Word 700 also includes multiple compute, communication, and addressing operations. In this exemplary embodiment, these operations include a VMM operation 702, program counter operation 703, a variable number of data operations 704, and a variable number of address operations 705.

It will be appreciated that various arrangements of this MIW may be used in various embodiments. For example, the word may comprise 1 INSTR_HEADER+1 CTRL_OP+2 DATA_OPS+2 ADDR_CTRL_OPS=128 bits. In another example, the word may comprise 1 INSTR_HEADER+1 CTRL_OP+3 DATA_OPS+3 ADDR_CTRL_OPS=168 bits. In another example, the word may comprise 1 INSTR_HEADER+1 CTRL_OP+8 DATA_OPS+3 ADDR_CTRL_OPS=256 bits. In another example, the word may comprise 1 INSTR_HEADER+1 CTRL_OP+6 DATA_OPS+4 ADDR_CTRL_OPS=240 bits.

As noted above, agents on a core run a deterministic schedule in lock-step. Agents share functional units, and must not use the same functional unit in the same cycle (assigned by the deterministic schedule). All agents take same unit of time for any operation. Accordingly, agent execution start times must be synchronized.

In some embodiments, to ensure synchronization, agents are started simultaneously from a single synchronization signal. An agent's instruction stream may be padded with NOPs or unrelated work to align start time with any computationally related agent's start time. Each agent may have a time offset to begin instruction execution following the single sync signal to align agent execution, as specified by the schedule.

In some embodiments, to ensure synchronization, agents are started individually from individual (per-agent) synchronization signals. In this case, individual sync signals must occur at the precise times required for synchronized operation, as specified by the schedule.

Static program analysis determines the longest execution path between all agents, and can infer any needed end or synchronization points at compile time.

Figure 8:
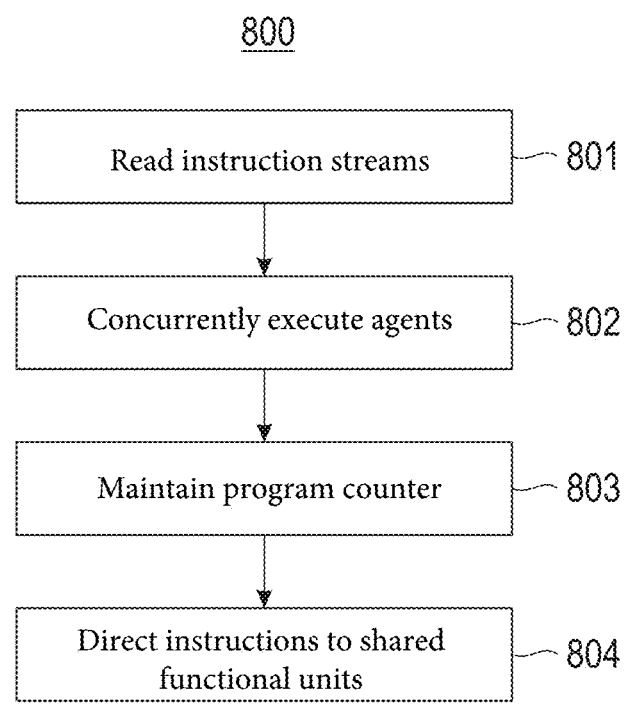
FIG. 8 illustrates a method for multi-agent instruction execution according to embodiments of the present disclosure.

Referring now to FIG. 8, a method for multi-agent instruction execution is illustrated according to embodiments of the present disclosure. At 801, a plurality of instruction streams is read from an instruction memory of a neural core, each instruction stream associated with one of a plurality of agents. At 802, the plurality of agents is concurrently executed by the neural core. At 803, a separate program counter is maintained for each of the plurality of agents. At 804, a plurality of operations is determined from the instructions of each instruction stream and directed to shared functional units of the neural core.

Figure 9:
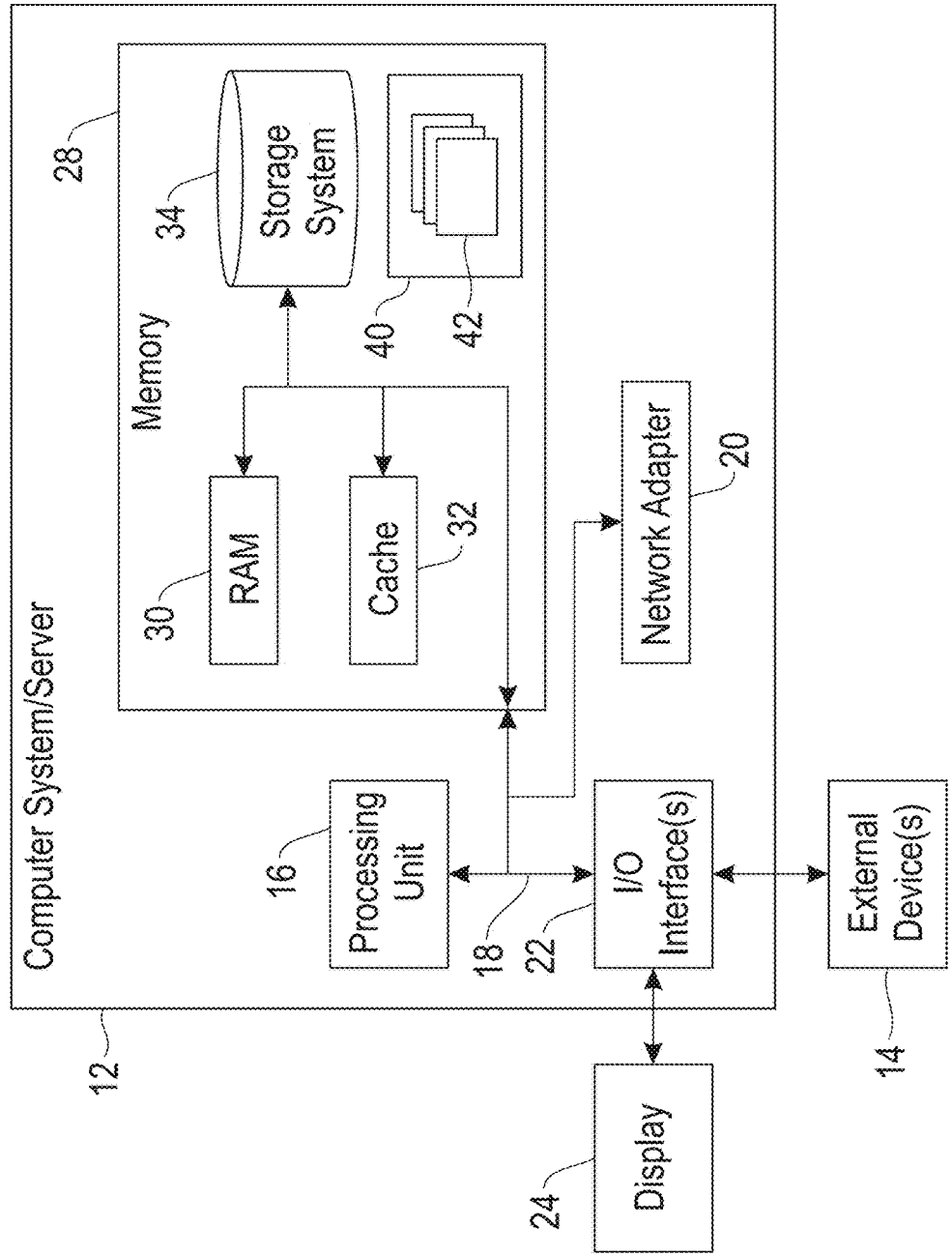
FIG. 9 depicts a computing node according to an embodiment of the present disclosure.

Referring now to FIG. 9, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural core comprising:
    an instruction memory, the instruction memory comprising a plurality of instruction streams, each instruction stream associated with one of a plurality of agents, each agent of the plurality of agents comprising a control engine and a program counter such that a first agent comprises a first control engine and a first program counter, each control engine of the plurality of control engines performing independent control operations, each program counter comprising a register; and
    a plurality of shared functional units,
    wherein the neural core is adapted to concurrently execute the plurality of instruction streams on the plurality of associated agents, wherein the execution comprises:
        modifying, by the first control engine, the first program counter,
        determining a plurality of operations from the instructions of each instruction stream, and
        directing the operations and at least one no-operation instruction to the shared functional units according to a prior modeling of access to the shared functional units and an offline state of each of the separate program counters, the operations being directed from the instruction memory and the at least one no-operation instruction delaying one or more of the plurality of agents to avoid simultaneous agent access to the shared functional units.

2. The neural core of claim 1, wherein the shared functional units comprise arithmetic, communication, address, and/or computation units.

3. The neural core of claim 1, wherein the each of the plurality of operations control one of the shared functional units.

4. The neural core of claim 1, wherein each of the plurality of instruction streams is statically scheduled.

5. The neural core of claim 4, wherein the static schedule is conflict free.

6. The neural core of claim 5, wherein the static schedule requires that no two operations access the same shared functional unit simultaneously.

7. The neural core of claim 1, wherein the plurality of operations are directed to the shared functional units at runtime.

8. The neural core of claim 7, wherein the plurality of operations are directed to the shared functional units within a sequence of time windows.

9. The neural core of claim 7, wherein directing the plurality of operations to the shared functional units comprises merging operations from each of the plurality of instruction streams.

10. The neural core of claim 9, wherein merging operations comprises detecting conflicts between operations directed to the same shared functional unit.

11. The neural core of claim 1, wherein determining the plurality of operations comprises decoding instructions of each instruction stream.

12. The neural core of claim 1, adapted to map the plurality of operations to any of the shared functional units.

13. The neural core of claim 1, wherein the instruction memory is logically segmented.

14. The neural core of claim 1, wherein the execution is divided into a plurality of cycles.

15. The neural core of claim 1, further comprising a plurality of parallel data paths, each comprising a subset of the plurality of shared functional units.

16. The neural core of claim 1, wherein the plurality of agents execute synchronously.

17. The neural core of claim 16, wherein synchronous execution is provided via a synchronization signal.

18. The neural core of claim 1, wherein the independent control operations comprise updating one or more loop counter and/or sequence counter.

19. A method comprising:
reading a plurality of instruction streams from an instruction memory of a neural core, each instruction stream associated with one of a plurality of agents, each agent of the plurality of agents comprising a control engine and a program counter such that a first agent comprises a first control engine and a first program counter, each control engine of the plurality of control engines performing independent control operations, each program counter comprising a register;
concurrently executing the plurality of agents by the neural core;
modifying, by the first control engine, the first program counter;
determining a plurality of operations from the instructions of each instruction stream; and
directing the operations and at least one no-operation instruction to shared functional units of the neural core according to a prior modeling of access to the shared functional units and to an offline state of each of the separate program counters, the operations being directed from the instruction memory and the at least one no-operation instruction delaying one or more of the plurality of agents to avoid simultaneous agent access to the shared functional units.

20. The method of claim 19, further comprising:
computing by the neural core a portion of a neural network layer.

21. A method comprising:
executing a plurality of instruction streams, each by one of a plurality of agents, each agent of the plurality of agents comprising a control engine and a program counter such that a first agent comprises a first control engine and a first program counter, each control engine of the plurality of control engines performing independent control operations, each program counter comprising a register; and
modifying, by the first control engine, the first program counter,
wherein
a plurality of shared functional units is controlled by the plurality of instruction streams, the plurality of the shared functional units performing an inference operation, and wherein a prior modeling of access to the shared functional units and offline states of the plurality of program counters are used to avoid simultaneous agent access to the shared functional units by delaying one or more of the plurality of agents using at least one no-operation instruction.

22. The method of claim 21, wherein the inference operations comprise computation, communication, or memory addressing operations.

* * * * *